United States Patent
Hasegawa

(10) Patent No.: US 9,741,990 B2
(45) Date of Patent: Aug. 22, 2017

(54) NONAQUEOUS ELECTROLYTE SECONDARY BATTERY LAMINATED SEPARATOR

(71) Applicant: Sumitomo Chemical Company, Limited, Tokyo (JP)

(72) Inventor: Hirohiko Hasegawa, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/357,708

(22) Filed: Nov. 21, 2016

(65) Prior Publication Data

US 2017/0155118 A1 Jun. 1, 2017

(30) Foreign Application Priority Data

Nov. 30, 2015 (JP) ................. 2015-233937

(51) Int. Cl.
  *H01M 2/14* (2006.01)
  *H01M 2/16* (2006.01)

(52) U.S. Cl.
  CPC ......... *H01M 2/1686* (2013.01); *H01M 2/166* (2013.01); *H01M 2/1653* (2013.01)

(58) Field of Classification Search
  CPC .. H01M 2/145; H01M 2/1646; H01M 2/1653; H01M 2/1686; H01M 2/162; H01M 2220/30; C23C 16/403; C23C 16/405
  See application file for complete search history.

(56) References Cited

U.S. PATENT DOCUMENTS

| | | | |
|---|---|---|---|
| 4,588,633 A | 5/1986 | Kono et al. | |
| 6,447,958 B1 | 9/2002 | Shinohara et al. | |
| 2002/0034689 A1 | 3/2002 | Hoshida et al. | |
| 2007/0128512 A1 | 6/2007 | Kaimai et al. | |
| 2009/0274955 A1* | 11/2009 | Kikuchi ............ | B01D 67/0027 429/144 |
| 2011/0293989 A1 | 12/2011 | Hasegawa et al. | |
| 2012/0129034 A1 | 5/2012 | Hasegawa et al. | |

FOREIGN PATENT DOCUMENTS

| | | |
|---|---|---|
| JP | S60-242035 A | 12/1985 |
| JP | H10-261393 | 9/1998 |
| JP | 2000030686 A | 1/2000 |
| JP | 2002-069221 A | 3/2002 |
| JP | 2004-227972 | 8/2004 |
| JP | 2009-205958 A | 9/2009 |
| JP | 2010-180341 A | 8/2010 |
| JP | 2010-195898 A | 9/2010 |
| JP | 2010-195899 A | 9/2010 |
| JP | 4771809 B2 | 9/2011 |
| JP | 2011-210435 A | 10/2011 |
| JP | 2011-216257 | 10/2011 |
| JP | 2011-216318 | 10/2011 |
| JP | 2012-076384 A | 4/2012 |
| JP | 2012-077220 A | 4/2012 |
| JP | 5308118 B2 | 10/2013 |
| JP | 2015-208894 | 11/2015 |
| KR | 2014-0071094 A | 6/2014 |
| WO | 2011/016571 A1 | 2/2011 |

OTHER PUBLICATIONS

Office Action issued Jul. 26, 2016 in KR Application No. 10-2016-0064620.
Office Action issued Apr. 5, 2016 in JP Application No. 2015-233937.

* cited by examiner

*Primary Examiner* — Mark F Huff
*Assistant Examiner* — Monique Wills
(74) *Attorney, Agent, or Firm* — Panitch Schwarze Belisario & Nadel LLP

(57) ABSTRACT

Provided is a nonaqueous electrolyte secondary battery laminated separator including a laminated porous film including a porous film and a porous layer. The piercing strength (S) of the laminated porous film satisfies Formula (1): $2 \text{ gf} \leq Sp-S \leq 25 \text{ gf}$, and the piercing strength (Sp) of the porous film after removal of the porous layer from the laminated porous film satisfies Formula (2): $300 \text{ gf} \leq S \leq 400$ gf. The nonaqueous electrolyte secondary battery laminated separator is excellent in output characteristic, shutdown characteristic, and piercing strength.

5 Claims, No Drawings

NONAQUEOUS ELECTROLYTE SECONDARY BATTERY LAMINATED SEPARATOR

This Nonprovisional application claims priority under 35 U.S.C. §119 on Patent Application No. 2015-233937 filed in Japan on Nov. 30, 2015, the entire contents of which are hereby incorporated by reference.

TECHNICAL FIELD

The present invention relates to a nonaqueous electrolyte secondary battery laminated separator, and also to a nonaqueous electrolyte secondary battery member and a nonaqueous electrolyte secondary battery each including the nonaqueous electrolyte secondary battery laminated separator.

BACKGROUND ART

Nonaqueous electrolyte secondary batteries, particularly lithium secondary batteries, lave high energy density and are thus in wide use as batteries for personal computers, mobile telephones, portable information terminals, and the like.

Nonaqueous electrolyte secondary batteries, typically lithium secondary batteries, have high energy density. Nonaqueous electrolyte secondary batteries let a large current flow and thus generate intense heat in the event of an accident such as a breakage of the battery or a breakage of the device using the battery has caused an internal short circuit or external short circuit. Nonaqueous electrolyte secondary batteries are thus required to prevent more than a certain level of heat generation to ensure a high level of safety.

Such a high level of safety is ensured typically by a method of imparting to the nonaqueous electrolyte secondary battery a shutdown function, which is a function of a separator blocking passage of ions between the anode and the cathode in the event of abnormal heat generation to prevent further heat generation. The shutdown function may be imparted to a separator by, for example, a method of using, as the separator, a porous film made of a material that is meltable in the event of abnormal heat generation. A battery including such a separator allows the porous film to be melted and made non-porous in the event of abnormal heat generation to block the ion passage for prevention of further heat generation.

An example separator having the shutdown function is a porous film containing polyolefin. Such a porous film (separator) is melted and made non-porous at a temperature of approximately 80° C. to 180° C. in the event of abnormal heat generation in the battery to block (shutdown) the ion passage for prevention of further heat generation. There have been proposed various methods for producing a porous polyolefin film having the shutdown function (see Patent Literatures 1 to 3).

To prevent a short circuit that may occur in a case where, for example, the battery generates intense heat, there have been proposed some nonaqueous electrolyte secondary battery separators that are excellent in shape stability at high temperatures. An example is a nonaqueous electrolyte secondary battery laminated separator including a laminated porous film, which is a laminate of (i) a heat-resistant porous layer and (ii) a porous film (hereinafter also referred to as "base material porous film") containing polyolefin as a main component (base material) (see, for example, Patent Literatures 4 and 5).

As lithium secondary batteries have an increasingly wider range of applications, there have been developed, for example, (i) a lithium secondary battery having a higher energy density and (ii) a lithium secondary battery having a better output characteristic. This has led to a demand for a safer separator. Further, there is also a demand for a smaller, thinner lithium secondary battery. Therefore, separators are under development that are thinner with performance capabilities such as the output characteristic and safety maintained or improved.

CITATION LIST

Patent Literature

[Patent Literature 1]
  Japanese Patent Application Publication, Tokukaishou, No. 60-242035 A (Publication Date: Dec. 2, 1985)
[Patent Literature 2]
  Japanese Patent Application Publication, Tokukaihei, No. 10-261393 A (Publication Date: Sep. 29, 1998)
[Patent Literature 3]
  Japanese Patent Application Publication, Tokukai, No. 2002-69221 A (Publication Date: Mar. 8, 2002)
[Patent Literature 4]
  Japanese Patent Application Publication, Tokukai, No. 2000-30686 A (Publication Date: Jan. 28, 2000)
[Patent Literature 5]
  Japanese Patent Application Publication, Tokukai, No. 2004-227972 A (Publication Date: Aug. 12, 2004)

SUMMARY OF INVENTION

Technical Problem

It has, however, been difficult for a thin nonaqueous electrolyte secondary battery laminated separator to have a sufficient piercing strength, a sufficient shutdown characteristic, and a sufficient air permeability at the same time.

Solution to Problem

In order to solve the above problem, the inventors of the present invention focused on the degree of kneading a resin composition for use in producing a porous film as a base material of a nonaqueous electrolyte secondary battery laminated separator, and have discovered that improving the degree of kneading allows for production of a nonaqueous electrolyte secondary battery laminated separator that has a sufficient piercing strength, a sufficient shutdown characteristic, and a sufficient air permeability at the same time. The inventors have thereby arrived at the present invention.

Specifically, a nonaqueous electrolyte secondary battery laminated separator of an embodiment of the present invention is a nonaqueous electrolyte secondary battery laminated separator including a laminated porous film, including: (a) a porous film containing a polyolefin component in an amount of not less than 80% by volume with respect to a total volume of the porous film (a); and (b) a porous layer containing a resin, the porous film (a) having a thickness of not less than 5 μm and not more than 20 μm, the laminated porous film having a thickness of not less than 6 μm and not more than 25 μm, the laminated porous film having a Gurley value of not more than 250 sec/100 mL, a piercing strength of the laminated porous film and a piercing strength of the porous film (a) after removal of the porous layer from the laminated porous film satisfy Formulae (1) and (2) below.

$$2 \text{ gf} \leq Sp-S \leq 25 \text{ gf} \qquad \text{Formula (1)}$$

$$300 \text{ gf} \leq S \leq 400 \text{ gf}, \qquad \text{Formula (2)}$$

where S is the piercing strength of the laminated porous film, and Sp is the piercing strength of the porous film (a) after the removal of the porous layer from the laminated porous film.

The nonaqueous electrolyte secondary battery laminated separator of an embodiment of the present invention may preferably be arranged such that the porous layer further contains a filler; and the filler is contained at a proportion of not less than 50 mass % and not more than 99 mass % with respect to a total amount of a combination of the filler and the resin. Further, the nonaqueous electrolyte secondary battery laminated separator of an embodiment of the present invention may preferably be arranged such that the thickness of the porous film (a) is not less than 6 μm and not more than 14 μm.

A nonaqueous electrolyte secondary battery member of an embodiment of the present invention includes: a cathode; a nonaqueous electrolyte secondary battery laminated separator of an embodiment of the present invention; and an anode, the cathode, the nonaqueous electrolyte secondary battery laminated separator, and the anode being arranged in this order.

A nonaqueous electrolyte secondary battery of an embodiment of the present invention includes a nonaqueous electrolyte secondary battery laminated separator of an embodiment of the present invention.

Advantageous Effects of Invention

A nonaqueous electrolyte secondary battery laminated separator of an embodiment of the present invention is advantageously thin, yet is excellent in air permeability, shutdown characteristic, piercing strength (physical strength).

DESCRIPTION OF EMBODIMENTS

The following description will discuss an embodiment of the present invention in detail. The numerical expression "A to B" in the description below means "not less than A and not more than B".

Embodiment 1: Nonaqueous Electrolyte Secondary Battery Laminated Separator

A nonaqueous electrolyte secondary battery laminated separator of an embodiment of the present invention is a nonaqueous electrolyte secondary battery laminated separator including a laminated porous film, including: (a) a porous film containing a polyolefin component in an amount of not less than 80% by volume with respect to a total volume of the porous film (a); and (b) a porous layer containing a resin, the porous film (a) having a thickness of not less than 5 μm and not more than 20 μm, the laminated porous film having a thickness of not less than 6 μm and not more than 25 μm, the laminated porous film having a Gurley value of not more than 250 sec/100 ml, a piercing strength of the laminated porous film and a piercing strength of the porous film (a) after removal of the porous layer from the laminated porous film satisfy Formulae (1) and (2) below.

$$2 \text{ gf} \leq Sp-S \leq 25 \text{ gf} \qquad \text{Formula (1)}$$

$$300 \text{ gf} \leq S \leq 400 \text{ gf}, \qquad \text{Formula (2)}$$

where S is the piercing strength of the laminated porous film, and Sp is the piercing strength of the porous film (a) after the removal of the porous layer from the laminated porous film.

The following description will discuss individual members of the nonaqueous electrolyte secondary battery laminated separator in detail.

<Porous Film (A Layer)>

A nonaqueous electrolyte secondary battery laminated separator of an embodiment of the present invention includes a porous film (hereinafter also referred to as "A layer") that has inside itself pores connected to one another and that allows a gas, a liquid, or the like to pass therethrough from one surface to the other. The porous film may include a single layer or a plurality of layers.

The A layer contains a polyolefin component at a proportion of not less than 80% by volume, preferably not less than 90% by volume, more preferably not less than 95% by volume, with respect to the entire A layer. The polyolefin component refers to a component contained in the A layer and made of polyolefin.

The polyolefin contained in the A layer is not limited to any particular one, and may be a high-molecular-weight polymer produced by polymerizing, for example, ethylene, propylene, 1-butene, 4-methyl-1-pentene, or 1-hexene. The polymer may be a homopolymer (for example, polyethylene, polypropylene, or polybutene) or a copolymer (for example, an ethylene-propylene copolymer). Further, the polymer is preferably a polyolefin having a weight-average molecular weight of not less than 1,000,000 so that even in a case where the A layer or the separator is a thin film, the strength can be increased of the A layer or of the entire nonaqueous electrolyte secondary battery laminated separator of the present invention that includes the A layer. The polymer is, in particular, preferably a high-molecular-weight polyethylene containing ethylene as a main component and having a weight-average molecular weight of not less than 1,000,000 because such a polyethylene makes it possible to prevent (shutdown) the flow of an excessively large current at a lower temperature. The polyolefin component may contain (i) only one kind of polymer or (ii) a mixture of two or more kinds of polymers. The polyolefin component may, for example, contain a mixture of (i) a high-molecular-weight polyethylene having a weight-average molecular weight of not less than 1,000,000 and (ii) a low-molecular-weight polyethylene having a weight-average molecular weight of not more than 10,000. The porous film may contain a component(s) other than a polyolefin resin as long as that component(s) does not impair the function of the porous film.

The A layer has a Gurley value (air permeability) preferably within a range of 50 sec/100 ml to 200 sec/100 ml, more preferably within a range of 60 sec/100 ml to 180 sec/100 ml. The A layer having a Gurley value (air permeability) within the above range is preferable because such an arrangement allows the nonaqueous electrolyte secondary battery laminated separator of an embodiment of the present invention to have a Gurley value (air permeability) of not more than 250 sec/100 ml, that is, a sufficient ion permeability.

The A layer has a thickness within a range of 5 µm to 20 µm, preferably within a range of 6 µm to 14 µm, more preferably within a range of 7 µm to 14 µm. The A layer having a thickness within the above range allows a nonaqueous electrolyte secondary battery including the nonaqueous electrolyte secondary battery laminated separator of an embodiment of the present invention to have a high energy density. The A layer having a thickness of not less than 5 µm is preferable because such an arrangement allows the nonaqueous electrolyte secondary battery laminated separator of an embodiment of the present invention to have a sufficient piercing strength and makes it possible to sufficiently prevent an internal short circuit resulting from, for example, a breakage of the battery. The A layer having a thickness of not more than 20 µm is preferable because such an arrangement makes it possible to (i) prevent an increase in the resistance in transmissivity of lithium ions over the entire region of a nonaqueous electrolyte secondary battery separator including the porous film and to thereby prevent deterioration of the cathode due to repeated charging/discharging cycles End degradation of characteristics such as the rate characteristic and cycle characteristic, and also makes it possible to (ii) prevent an increase of the distance between the anode and the cathode and to thereby prevent an increase in the size of the nonaqueous electrolyte secondary battery.

The A layer has a weight per unit area normally within a range of 4 $g/m^2$ to 12 $g/m^2$, preferably within a range of 5 $g/m^2$ to 8 $g/m^2$, because such an arrangement allows (i) the nonaqueous electrolyte secondary battery laminated separator of an embodiment of the present invention, which includes the A layer as a member, to have an increase in the strength, the thickness, the handleability, and the weight of the nonaqueous secondary battery laminated separator and (ii) a nonaqueous electrolyte secondary battery including the separator to have an increase in, for example, the energy density per unit weight and the energy density per unit volume.

The A layer has a porosity preferably within a range of 30% by volume to 50% by volume, more preferably within a range of 35% by volume to 50% by volume, in order to allow a nonaqueous electrolyte secondary battery including a nonaqueous electrolyte secondary battery laminated separator including the A layer as a member to retain a larger amount of electrolyte solution and (ii) have the function (shutdown) of reliably preventing the flow of an excessively large current at a lower temperature.

The porous film will, if it has a porosity of less than 30% by volume, have an increased resistance. The porous film will, if it has a porosity of more than 55% by volume, have a decreased mechanical strength.

The porous film has pores each having a pore size of preferably not more than 0.3 µm, more preferably not more than 0.14 µm, in order to, in a case where the porous film is used as a member of a nonaqueous electrolyte secondary battery laminated separator, achieve a sufficient ion permeability and prevent particles from entering the cathode, the anode, or the like.

The nonaqueous electrolyte secondary battery laminated separator of an embodiment of the present invention includes a porous layer disposed on the porous film by a method described later. In a case where the porous layer is formed by applying a coating solution containing water as a medium, the porous film is preferably subjected to a hydrophilization treatment before the formation of the porous layer, that is, before the application of a coating solution described later. Performing a hydrophilization treatment on the porous film further improves the coating easiness for the coating solution and thus allows a more uniform porous layer to be formed. This hydrophilization treatment is effective in a case where the solvent (disperse medium) contained in the coating solution has a high proportion of water. Specific examples of the hydrophilization treatment include publicly known treatments such as (i) a chemical treatment involving an acid, an alkali, or the like, (ii) a corona treatment, and (iii) a plasma treatment. Among these hydrophilization treatments, a corona treatment is preferable because it can not only hydrophilize the porous film within a relatively short time period, but also hydrophilize only a surface and its vicinity of the porous film to leave the inside of the porous film unchanged in quality.

<Method for Producing Porous Film (A Layer)>

The porous film for an embodiment of the present invention may be produced by any method that allows a laminated porous film including (i) the porous film and (ii) a later-described heat-resistant layer on the porous film to produce the effects of an embodiment of the present invention. Examples of the method include the following methods disclosed in Patent Literatures 1 to 3 above:

(i) Method of adding a plasticizer to a thermoplastic resin to shape the thermoplastic resin composition of the plasticizer and the thermoplastic resin into a film and then removing the plasticizer with use of an appropriate solvent.

(ii) Method of selectively drawing a structurally weak, amorphous portion of a thermoplastic resin film, produced by a publicly known method, to form micropores.

(iii) Method of adding a low-molecular-weight polyolefin and fine particles to an ultra-high-molecular-weight polyethylene to shape the mixture of the low-molecular-weight polyolefin, the ultra-high-molecular-weight polyethylene, and the fine particles into a film and then removing the fine particles.

Depending largely on the composition and structure, for example, of the porous layer and the laminating method, the above method of adding a low-molecular-weight polyolefin and fine particles to an ultra-high-molecular-weight polyethylene to shape the mixture of the low-molecular-weight polyolefin, the ultra-high-molecular-weight polyethylene, and the fine particles into a film and then removing the fine particles allows for production of a porous polyolefin film suitable as a member of the nonaqueous electrolyte secondary battery laminated separator of an embodiment of the present invention by optimization of the respective shapes of raw materials such as the particle size of a low-molecular-weight polyolefin as a raw material, the particle size of calcium carbonate as a raw material, and the surface shape of calcium carbonate as a raw material. Further, a porous polyolefin film suitable as a member of the nonaqueous electrolyte secondary battery laminated separator of an embodiment of the present invention may be produced also by optimization of (i) the mixing ratio of a ultra-high-molecular-weight polyethylene, a low-molecular-weight polyolefin, and calcium carbonate and (ii) the state of how a polyolefin resin composition produced by mixing the above ingredients is kneaded when the polyolefin resin composition starts to melt.

<Porous Layer>

The nonaqueous electrolyte secondary battery laminated separator of an embodiment of the present invention includes a porous layer containing resin. The porous layer preferably further contains a filler in addition to resin.

The porous layer for an embodiment of the present invention is preferably disposed on one surface or both surfaces of the porous film. The porous layer preferably contains a resin that is insoluble in the electrolyte solution of the battery and that is electrochemically stable when the battery is in normal use. In a case where the porous layer is disposed on one surface of the porous film, the porous layer is preferably on a surface of the porous film which surface faces the cathode of the nonaqueous electrolyte secondary battery to be produced, more preferably on a surface of the porous film which surface comes into contact with the cathode.

Examples of the resin contained in the porous layer include polyolefins such as polyethylene, polypropylene, polybutene, and ethylene-propylene copolymer; fluorine-containing resins such as polyvinylidene fluoride (PVDF) and polytetrafluoroethylene; fluorine-containing rubbers such as a vinylidene fluoride-hexafluoro propylene copolymer, a tetrafluoroethylene-hexafluoro propylene copolymer, a tetrafluoroethylene-perfluoroalkyl vinyl ether copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, vinylidene fluoride-hexafluoropropylene-tetrafluoroethylene copolymer and ethylene-tetrafluoroetlylene copolymer; aromatic polyamides; fully aromatic polyamides (aramid resins); rubbers such as styrene-butadiene copolymer and a hydride thereof, methacrylic acid ester copolymer, acrylonitrile-acrylic acid ester copolymer, styrene-acrylic acid ester copolymer, ethylene propylene rubber, and polyvinyl acetate; resins with a melting point or glass transition temperature of not lower than 180° C. such as polyphenylene ether, polysulfone, polyether sulfone, poly phenylene sulfide, polyetherimide, polyamide imide, polyetheramide, and polyester; and water-soluble polymers such as polyvinyl alcohol, polyethyleneglycol, cellulose ether, sodium alginate, polyacrylic acid, polyacrylamide, and polymethacrylic acid. The resin is, among the above examples, preferably a heat-resistant resin such as polyamide, polyimide, polyamide imide, polycarbonate, polyacetal, polysulfone, polyphenylene sulfide, polyether ether ketone, aromatic polyester, polyether sulfone, polyetherimide, and cellulose ethers. The porous layer may contain (i) only one kind or (ii) a mixture of two or more kinds of the above heat-resistant resins.

The filler that may be contained in the porous layer may be fine particles, and may be organic fine particles or inorganic fine particles. The resin contained in the porous layer thus function as a binder resin that binds filler particles to one another and the filler to the porous film.

Specific examples of the organic fine particles that may be contained in the porous layer for an embodiment of the present invention include fine particles made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, ethylene tetrafluoride-propylene hexafluoride copolymer, tetrafluoroethylene ethylene copolymer, and polyvinylidene fluoride; melamine resin; urea resin; polyethylene; polypropylene; and polyacrylic acid and polymethacrylic acid.

Specific examples of the inorganic fine particles that may be contained in the porous layer for an embodiment of the present invention include inorganic fine particles made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, or glass. The porous layer may contain (i) only one kind of filler or (ii) two or more kinds of fillers in combination.

Among the above fillers, a filler made of inorganic matter is suitable. A filler made of an inorganic oxide such as silica, calcium oxide, magnesium oxide, titanium oxide, alumina, mica, or zeolite is preferable. A filler made of at least one kind selected from the group consisting of silica, magnesium oxide, titanium oxide, and alumina is more preferable. A filler made of alumina is particularly preferable. While alumina has many crystal forms such as $\alpha$-alumina, $\beta$-alumina, $\downarrow$-alumina, and $\theta$-alumina, any of the crystal forms can be used suitably. Among the above crystal forms, $\alpha$-alumina is the most preferable because it is particularly high in thermal stability and chemical stability.

In a case where the porous layer contains a filler, the porous layer contains the filler at a proportion of preferably not less than 30% by volume with respect to the total amount of the filler and the resin. The porous layer containing a filler at a proportion of not less than 30% by volume allows the piercing strength to change through removal of the porous layer, and thus allows an embodiment of the present invention to produce its effects significantly.

Further, in the case where the porous layer contains a filler, the porous layer contains the filler at a proportion of more preferably not less than 30 mass % and not more than 99 mass % with respect to the total amount of the filler and the resin. The porous layer containing a filler at a proportion within the above range makes it less likely for a void formed by contact among fine particles to be blocked by resin, for example. This allows the porous layer to have a sufficient ion permeability and a weight per unit area having an appropriate value.

The production of the nonaqueous electrolyte secondary battery laminated separator of an embodiment of the present invention normally involves dissolving or dispersing the resin in a solvent and dispersing the filler in the solvent to prepare a coating solution for forming a porous layer.

The solvent (disperse medium) may be any solvent that does not adversely influence the porous film, that allows the resin to be dissolved or dispersed uniformly and stably, and that allows the filler to be dispersed uniformly and stably. Specific examples of the solvent (disperse medium) include water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, and N,N-dimethylformamide. The production may use only one kind of solvent (disperse medium) or two or more kinds of solvents in combination.

The coating solution may be prepared by any method that allows the coating solution to satisfy conditions such as the resin solid content (resin concentration) and the amount of the filler necessary for a desired porous layer. Specific examples of the method for preparing the coating solution include mechanical stirring method, ultrasonic dispersion method, high pressure dispersion method, and media dispersion method. Further, the fine particles may be dispersed in a solvent (disperse medium) with use of a conventionally publicly known disperser such as a three one motor, a homogenizer, a media type disperser, or a pressure disperser. Those fine particles may be mixed in any order as long as there occurs no particular problem such as formation of a precipitate. The fine particles may, for example, be mixed in such a manner that (i) the resin and other ingredients such as the filler are added to a solvent together or in any order to be mixed or (ii) the individual ingredients are first dissolved or dispersed in respective solvents and the resulting solution(s) and/or dispersion(s) are mixed with each other. Further, the coating solution may contain, as a component(s) other than the resin or filler, an additive(s) such as a dispersing agent, a plasticizer, a surfactant, and a pH adjusting agent as long as an embodiment of the present invention can attain its objects. The coating solution may contain the additive(s) in any amount(s) as long as an embodiment of the present invention can attain its objects.

There is no particular limit to how the coating solution is applied to the porous film, that is, how a porous layer is formed on a surface of a porous film that has been subjected to a hydrophilization treatment as necessary. In a case where a porous layer is deposited on each of both surfaces of the porous film, (i) a sequential deposition method may be used, which forms a porous layer on one surface of the porous film and then forms another porous layer on the other surface, or (ii) a simultaneous deposition method may be used, which forms two porous layers simultaneously on respective surfaces of the porous film. The porous layer may be formed by, for example, (i) a method of directly applying the coating solution to a surface of the porous film and removing the solvent (disperse medium) from the coating solution, (ii) applying the coating solution to an appropriate support, removing the solvent (disperse medium) from the coating solution to form a porous layer, pressure-bonding the porous layer and the porous film to each other, and peeling the support off, (iii) a method of applying the coating solution to a surface of an appropriate support, pressure-bonding the porous film to the surface of the support, peeling the support off, and removing the solvent (disperse medium) from the coating solution, or (iv) a method of immersing the porous film in the coating solution for dip coating and removing the solvent (disperse medium) from the coating solution. The thickness of the porous layer may be controlled by adjusting, for example, (i) the thickness of a coating film in a wet state after the coating, (ii) the weight ratio of the resin and the filler, and/or (iii) the solid content concentration of the coating solution (that is, the sum of the resin concentration and the filler concentration). The support is, for example, a resin film, a metal belt, or a drum.

The coating solution may be applied to the porous film or support by any method that allows for, for example, a necessary weight per unit area and a necessary coating area. The coating solution may be applied by a conventionally publicly known method. Specific examples of the method include gravure coater method, small-diameter gravure coater method, reverse roll coater method, transfer roll coater method, kiss coater method, dip coater method, knife coater method, air doctor blade coater method, blade coater method, rod coater method, squeeze coater method, cast coater method, bar coater method, die coater method, screen printing method, and spray applying method.

The solvent (disperse medium) is removed typically by a drying method. Examples of the drying method include natural drying, air-blowing drying, heat drying, and drying under reduced pressure. The solvent may, however, be removed by any method that allows the solvent (disperse medium) to be removed sufficiently. The coating solution may be dried after replacing the solvent (disperse medium) contained in the coating solution with another solvent. The solvent (disperse medium) may be replaced with another solvent for removal by, for example, a method of (i) preparing another solvent (hereinafter referred to as "solvent X") that dissolves the solvent (disperse medium) contained in the coating solution and that does not dissolve the resin contained in the coating solution, (ii) immersing the porous film or support, to which the coating solution has been applied and on which a coaling film has been formed, into the solvent X to replace the solvent (disperse medium) in the coaling film on the porous film or support with the solvent X, and (iii) evaporating the solvent X. This method allows the solvent (disperse medium) to be removed efficiently from the coating solution. In a case where the coating film, formed on the porous film or support by applying the coating solution thereto, is heated to remove the solvent (disperse medium) or solvent X from the coating film, the coaling film is desirably heated at a temperature that docs not decrease the air permeability of the porous film, specifically within a range of 30° C. to 120° C., preferably within a range of 40° C. to 80° C., to prevent pores in the porous film from contracting to decrease the air permeability of the porous film.

The porous layer for an embodiment of the present invention, which porous layer is formed by the above method, may have a thickness selected as appropriate in view of the thickness of a nonaqueous electrolyte secondary battery laminated separator to be produced. The porous layer, however, has a thickness preferably with a range of 0.5 μm to 15 μm (for each surface), more preferably within a range of 2 μm to 10 μm (for each surface) in a case where (i) a porous film is used as a base material and (ii) a porous layer is deposited on one or both surfaces of the porous film.

The physical properties of the porous layer are described below to indicate, in a case where a porous layer is deposited on each of both surfaces of a porous film, at least the physical properties of a porous layer on a surface of the porous film which surface faces the cathode when the porous film is included in a nonaqueous electrolyte secondary battery.

The porous layer has a weight per unit area (for each surface) selected as appropriate in view of the strength, the thickness, the weight, and the handleability of the nonaqueous electrolyte secondary battery laminated separator of an embodiment of the present invention. The porous layer, however, has a weight per unit area normally within a range of preferably 1 $g/m^2$ to 20 $g/m^2$, more preferably 2 $g/m^2$ to 10 $g/m^2$, in order to increase, for example, the energy density per unit weight and energy density per unit volume of a nonaqueous electrolyte secondary battery including the nonaqueous electrolyte secondary battery laminated separator as a member. The porous layer having a weight per unit area within the above range is preferable because such an arrangement allows for a reduction in the weight of a nonaqueous electrolyte secondary battery including as a member a nonaqueous electrolyte secondary battery laminated separator including the porous layer.

The porous layer has a porosity preferably within a range of 20% by volume to 90% by volume, more preferably within a range of 30% by volume to 80% by volume, because such an arrangement allows a nonaqueous electrolyte secondary battery laminated separator including the porous layer to have a sufficient ion permeability. The porous layer has pores each having a pore size of preferably not more than 1 μm, more preferably not more than 0.5 μm, because such an arrangement allows a nonaqueous electrolyte secondary battery laminated separator including the porous layer to have a sufficient ion permeability.

<Laminated Porous Film>

A nonaqueous electrolyte secondary battery laminated separator of an embodiment of the present invention is a laminated porous film including the porous film and the porous layer.

The laminated porous film of an embodiment of the present invention has a thickness of not less than 6 μm and not more than 25 μm, preferably not less than 10 μm and not more than 20 μm. The laminated porous film having a thickness of not less than 6 μm makes it possible to sufficiently prevent an internal short circuit resulting from, for example, a breakage of the battery. The laminated porous film having a thickness of not more than 25 μm makes it possible to (i) prevent an increase in the resistance in transmissivity of lithium ions over the entire region of a nonaqueous electrolyte secondary battery separator as the laminated porous film and to thereby prevent deterioration of the cathode due to repeated charging/discharging cycles and degradation of characteristics such as the rate characteristic and cycle characteristic, and also makes it possible to (ii) prevent an increase of the distance between the anode and the cathode and to thereby prevent an increase in the size of the nonaqueous electrolyte secondary battery.

The laminated porous film of an embodiment of the present invention has a Gurley value (air permeability) of not more than 250 sec/100 mL, preferably not more than 200 sec/100 mL. The laminated porous film having a Gurley value of not more than 250 sec/100 mL allows the nonaqueous electrolyte secondary battery laminated separator of an embodiment of the present invention to have a sufficient ion permeability.

A method including the steps (i) to (iii) below is used to measure the piercing strength (S) of the laminated porous film of an embodiment of the present invention and the piercing strength (Sp) of the porous film, which is left after removal of the porous layer from the laminated porous film.

(i) Step of fixing a laminated porous film with use of a washer having a Φ of 12 mm, causing a pin (having a pin diameter Φ of 1 mm and a paint with 0.5 R) to penetrate the laminated porous film from the porous layer side at 200 mm/min, and measuring the maximum stress (gf) during the penetration to use the measured value as the piercing strength (S) of the laminated porous film.

(ii) Step of subsequently removing the porous layer from the laminated porous film.

(iii) Step of fixing the porous film, left after the removal of the porous layer from the laminated porous film, with use of a washer having a Φ of 12 mm, causing a pin (having a pin diameter Φ of 1 mm and a paint with 0.5 R) to penetrate the porous film at 200 mm/min, and measuring the maximum stress (gf) during the penetration to use the measured value as the piercing strength (Sp) of the porous film, left after the removal of the porous layer from the laminated porous film.

The porous layer may be removed from the laminated porous film by any method. The porous layer may be removed by, for example, a method of peeling the porous layer off from the laminated porous film with use of tape (Scotch [produced by 3M Company]) or a method of (i) immersing the laminated porous film into water, (ii) cleaning the laminated porous film by irradiation with ultrasonic waves, and (iii) drying the laminated porous film at room temperature.

The piercing strength (S) of the laminated porous film of an embodiment of the present invention and the piercing strength (Sp) of the porous film, which is left after the removal of the porous layer from the laminated porous film, both satisfy Formulae (1) and (2) below.

$$2\ gf \leq Sp - S \leq 25\ gf \quad \text{Formula (1)}$$

$$300\ gf \leq S \leq 400\ gf \quad \text{Formula (2)}$$

Embodiment 2: Nonaqueous Electrolyte Secondary Battery Member; Embodiment 3: Nonaqueous Electrolyte Secondary Battery Embodiment 2 of the present invention is a nonaqueous electrolyte secondary battery member including (i) a cathode, (ii) the nonaqueous electrolyte secondary battery laminated separator as Embodiment 1 of the present invention, and (iii) an anode, the cathode, the nonaqueous electrolyte secondary battery laminated separator, and the anode being arranged in that order. Embodiment 3 of the present invention is a nonaqueous electrolyte secondary battery including the nonaqueous electrolyte secondary battery laminated separator as Embodiment 1 of the present invention. The description below deals with (i) a lithium ion secondary battery member as an example of the nonaqueous electrolyte secondary battery member and (ii) a lithium ion secondary battery as an example of the nonaqueous electrolyte secondary battery. Those elements of a nonaqueous electrolyte secondary battery member and nonaqueous electrolyte secondary battery which are other than the above nonaqueous electrolyte secondary battery laminated separator are not limited to the elements described below.

The nonaqueous electrolyte secondary battery member and nonaqueous electrolyte secondary battery in accordance with an embodiment of the present invention may include, for example, a nonaqueous electrolyte solution prepared by dissolving a lithium salt in an organic solvent. Examples of the lithium salt include $LiClO_4$, $LiPF_6$, $LiAsF_6$, $LiSbF_6$, $LiBF_4 LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use (i) only one kind of the above lithium salts or (ii) two or more kinds of the above lithium salts in combination. The present embodiment preferably uses, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte solution include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxylethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvent. The present embodiment may use (i) only one kind of the above organic solvents or (ii) two or more kinds of the above organic solvents in combination. Among the above organic solvents, carbonates are preferable. A mixed solvent of a cyclic carbonate and an acyclic carbonate or a mixed solvent of a cyclic carbonate and an ether is more preferable. The mixed solvent of a cyclic carbonate and an acyclic carbonate is preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite or artificial graphite.

The cathode is normally a sheet-shaped cathode including (i) a cathode mix containing a cathode active material, a conductive material, and a binding agent and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni. Among such lithium complex oxides, (i) a lithium complex oxide having an $\alpha$-NaFeO$_2$ structure such as lithium nickelate and lithium cobaltate and (ii) a lithium complex oxide having a spinel structure such as lithium manganese spinel are preferable because such lithium complex oxides have a high average discharge potential. The lithium complex oxide containing the at least one transition metal may further contain any of various metallic elements, and is more preferably complex lithium nickelate. Further, the complex lithium nickelate further preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic in a case where it is used in a high-capacity battery. The active material particularly preferably contains Al or Mn, and contains Ni at a proportion of not less than 85%, further preferably not less than 90%. This is because a nonaqueous electrolyte secondary battery including a cathode containing such an active material has an excellent cycle characteristic in a case where the nonaqueous electrolyte secondary battery has a high capacity.

Examples of the conductive material include carbonaceous materials such as natural graphite, artificial graphite, cokes, carbon black, pyrolytic carbons, carbon fiber, and a fired product of an organic polymer compound. The present embodiment may use (i) only one kind of the above conductive materials or (ii) two or more kinds of the above conductive materials in combination, for example, a mixture of artificial graphite and carbon black.

Examples of the binding agent include thermoplastic resins such as polyvinylidene fluoride, a copolymer of vinylidene fluoride, polytetrafluoroethylene, a vinylidene fluoride-hexafluoro propylene copolymer, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and a thermoplastic polyimide, polyethylene, and polypropylene, as well as acrylic resin and styrene-butadiene-rubber. The binding agent functions also as a thickening agent.

The cathode mix may be prepared by, for example, a method of applying pressure to the cathode active material, the conductive material, and the binding agent on the cathode current collector or a method of using an appropriate organic solvent so that the cathode active material, the conductive material, and the binding agent are in a paste form.

The cathode current collector is, for example, an electric conductor such as Al, Ni, and stainless steel, among which Al is preferable because Al is easily processed into a thin film and is inexpensive.

The sheet-shaped cathode may be produced, that is, the cathode mix may be supported by the cathode current collector, by, for example, a method of applying pressure to the cathode active material, the conductive material, and the binding agent on the cathode current collector to form a cathode mix thereon or a method of (i) using an appropriate organic solvent so that the cathode active material, the conductive material, and the binding agent are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

The anode is normally a sheet-shaped anode including (i) an anode mix containing an anode active material and (ii) an anode current collector supporting the anode mix thereon. The sheet-shaped anode preferably contains the above-described conductive material and binding agent.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped and dedoped with lithium ions at an electric potential lower than that for the cathode; metals that can be alloyed with an alkali metal such as aluminum (Al), lead (Pb), tin (Sn), bismuth (Bi) and silicon (Si); cubic-crystal intermetallic compounds into the lattice of which an alkali metal is insertable (for example, AlSb, Mg$_2$Si, and NiSi$_2$); and a lithium nitrogen compound such as Li$_{3-x}$M$_x$N (where M is a transition metal). Among the above anode active materials, a carbonaceous material containing a graphite material such as natural graphite or artificial graphite as a main component is preferable because such a carbonaceous material has high electric potential flatness and low average discharge potential, and can thus be combined with a cathode to achieve high energy density. The anode active material is more preferably a mixture of graphite and silicon with a Si content of not less than 5%, further preferably not less than 10%, with respect to the carbon (C) of the graphite.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel, among which Cu is preferable because Cu is not easily alloyed with lithium in the case of a lithium ion secondary battery and is easily processed into a thin film.

The sheet-shaped anode may be produced, that is, the anode mix may be supported by the anode current collector, by for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The paste preferably contains the above-described conductive material and binding agent.

The nonaqueous electrolyte secondary battery in accordance with an embodiment of the present invention may be produced by (i) arranging the cathode, the nonaqueous electrolyte secondary battery laminated separator of an embodiment of the present invention, and the anode in that order to form a nonaqueous electrolyte secondary battery member in accordance with an embodiment of the present invention, (ii) inserting the nonaqueous electrolyte secondary battery member into a container for use as a housing of the nonaqueous electrolyte secondary battery, (iii) filling the container with a nonaqueous electrolyte solution, and (iv) hermetically sealing the container under reduced pressure. The nonaqueous electrolyte secondary battery may have any shape such as the shape of a thin plate (sheet), a disk, a cylinder, or a prism such as a cuboid. The nonaqueous electrolyte secondary battery may be produced by any method, and may be produced by a conventionally publicly known method.

The nonaqueous electrolyte secondary battery of an embodiment of the present invention includes a nonaqueous electrolyte secondary battery laminated separator that is in the form of a thin, laminated porous film including a porous layer, yet has a sufficient piercing strength, a sufficient ion permeability, and a sufficient shutdown characteristic. This allows the nonaqueous electrolyte secondary battery of an embodiment of the present invention to have both an excellent output characteristic and a high level of safety. Similarly, the nonaqueous electrolyte secondary battery member of an embodiment of the present invention is suitably usable in the production of a nonaqueous electrolyte secondary battery that is designed to have both an excellent output characteristic and a high level of safety.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

EXAMPLES

The following description will discuss the present invention in greater detail on the basis of Examples. The present invention is, however, not limited to the Examples.

[Measurement Method]

In each Example and Comparative Example, properties of a laminated porous film were measured by the methods below.

(1) Thickness Measurement (Unit: μm)

The thickness of each film was measured in conformity with a JIS standard (K7130-1992).

(2) Weight Per Unit Area (Unit: g/m$^2$)

A square with each side having a length of 10 cm was cut out as a sample from the laminated porous film, and its weight W1 (g) was measured. Tape (Scotch [produced by 3M Company]) was attached to the sample on the porous layer side and detached therefrom, and the weight W2 (g) of the remaining porous film was then measured. The weight per unit area of the porous film and the weight per unit area of the porous layer were calculated on the basis of the following formulae:

Weight per unit area of the porous film (g/m$^2$)=W2 (g)/(0.1 m×0.1 m)

Weight per unit area of the porous layer (g/m$^2$)= (W1−W2) (g)/(0.1 m×0.1 m)

(3) Air Permeability (Unit: Sec/100 cc)

The air permeability of each film was measured in conformity with JIS P8117 with use of a Gurley-type densometer (produced by Toyo Seiki Seisaku-sho Ltd.) equipped with a digital timer.

(4) Piercing Strength (gf)

A method including the steps (i) to (iii) below was used to measure the piercing strength (S) of the laminated porous film and the piercing strength (Sp) of the porous film, which was left after removal of the porous layer from the laminated porous film.

(i) Step of fixing a laminated porous film with use of a washer having a Φ of 12 mm, causing a pin (having a pin diameter Φ of 1 mm and a point with 0.5 R) to penetrate the laminated porous film from the porous layer side at 200 mm/min, and measuring the maximum stress (gf) during the penetration to use the measured value as the piercing strength (S) of the laminated porous film.

(ii) Step of subsequently removing the porous layer from the laminated porous film.

(iii) Step of fixing the porous film, left after the removal of the porous layer from the laminated porous film, with use of a washer having a Φ of 12 mm, causing a pin (having a pin diameter Φ of 1 mm and a paint with 0.5 R) to penetrate the porous film at 200 mm/min, and measuring the maximum stress (gf) during the penetration to use the measured value as the piercing strength (Sp) of the porous film, left after the removal of the porous layer from the laminated porous film.

(5) Measurement of Shutdown (SD) Characteristic

A cell for SD measurement (hereinafter referred to as "cell") was used to measure the SD temperature.

Specifically, the SD characteristic was measured by the following method: (a) A laminated porous film having a ϕ of 17.5 mm was permeated with an electrolyte solution, sandwiched between two stainless steel electrodes, and fixed with use of a clip. This prepared a cell. The electrolyte solution was prepared by dissolving 1 mol/L of LiBF$_4$ in a mixed solvent of 50 vol % of ethylene carbonate and 50 vol % of diethyl carbonate. (b) Terminals of an impedance analyzer were connected to the respective opposite poles of the cell prepared, (c) While the cell was heated in an oven at a rate of 15° C./min, the resistance value at 1 kHz of the cell was measured. The cell temperature when the resistance value exceeded 500Ω was measured. The measured temperature was defined as the SD temperature.

[Screw Configuration of Kneader]

Each of the Examples and Comparative Examples used a biaxial kneading machine equipped with one of the two types of screws configured as below. The two types of screws were each configured to have three zones, namely a heating zone, a melting zone, and a kneading zone, as follows:

Effective Length of Screw:
Screw length (L)/Screw diameter (D)=60.5
Heating Zone:
L/D=12.5
Consisting only of progressive segments
Melting Zone:
L/D=15.5
Total length of kneading segments is L/D=13.5
Kneading Zone:
L/D=32.5
Total length of kneading segments is L/D=17.5

One of the two screw configurations included only segments each with two spirals for the kneading segments of the melting zone (hereinafter referred to as "screw configuration I"). The other screw configuration included segments each with two spirals and L/D=8.5 and segments each with three starts and L/D=5.0 for the kneading segments of the melting zone (hereinafter referred to as "screw configuration II").

[Preparation of Coating Solution for Forming Porous Layer]

Production Example 1

A coating solution A was prepared by the method described below that contained polylparaphenylene terephthalamide) as the resin and alumina as the filler.

A 3-liter separable flask having a stirring blade, a thermometer, a nitrogen entry tube, and a powder addition opening was fully dried. Then, the flask was charged with 2200 g of N-methyl-2-pyrrolidone (NMP) and 151.07 g of calcium chloride powder vacuum-dried at for 2 hours. The flask was heated up to 100° C. to completely dissolve the calcium chloride powder in the NMP. Then, the flask was cooled down to room temperature and charged with 68.23 g of paraphenylenediamine. The paraphenylenediamine was then completely dissolved. While the temperature of the solution prepared through the above operation was kept at 20° C.±2° C., 124.97 g of terephthalic acid dichloride was added in ten separate portions at intervals of approximately 5 minutes. Then, the resulting solution was stirred and kept at 20° C.±2° C. to be aged for 1 hour. Then, the resulting solution was filtered with use of a 1500-mesh stainless steel net. This prepared a para-aramid solution having a para-aramid concentration of 6 weight %. Next, 100 g of the para-aramid solution having a para-aramid concentration of 6 weight % was weighed out into a flask, and 300 g of NMP was added to the para-aramid solution. This prepared a solution having a para-aramid concentration of 1.5 weight %. This solution was stirred for 60 minutes. Then, 6 g of alumina C (produced by Nippon Aerosil Co., Ltd.) and 6 g of Advanced Alumina AA-03 (produced by Sumitomo Chemical Co., Ltd.) were mixed with the above solution having a para-aramid concentration of 1.5 weight %. The resulting mixture was stirred for 240 minutes. The resulting solution was filtered with use of a 1000-mesh wire net. Then, 0.73 g of calcium oxide was added to the filtrate. The resulting mixture was stirred for 240 minutes for neutralization, and degassed under reduced pressure. This prepared a coating solution A in the form of slurry.

Production Example 2

A coating solution B was prepared by the method described below that contained carboxymethyl cellulose (CMC) as the resin and alumina as the filler.

Carboxymethyl cellulose (CMC) (1110 [produced by Daicel FineChem Ltd.]) and alumina (AKP3000 [produced by Sumitomo Chemical Co., Ltd.]) were added at a weight ratio of 3:100 to a medium containing pure water and isopropyl alcohol at a weight ratio of 95:5, and were mixed with the medium so that the solid content concentration was 28 weight %. The resulting mixture was processed three times under a high-pressure dispersion condition (50 Pa). This prepared a solution containing CMC and alumina to serve as a coating solution B.

Example 1

Ultra-high-molecular-weight polyethylene powder (GUR4032 [produced by Ticona Corporation]) and polyethylene wax having a weight-average molecular weight of 1000 (FNP-0115 [produced by Nippon Seiro Co., Ltd.]), with a median size of 46 μm were prepared. To the combination (100 parts by weight) of the ultra-high-molecular-weight polyethylene powder (70 weight %) and the polyethylene wax (30 weight %), 0.4 weight % of an antioxidant (Irg1010 [produced by CIBA Specialty Chemicals Inc.]), 0.1 weight % of another antioxidant (P168 [produced by CIBA Specialty Chemicals Inc.]), and 1.3 weight % of sodium stearate were added. Further, calcium carbonate having an average pore size of 0.1 μm (produced by Maruo Calcium Co., Ltd.) was added at 36% by volume with respect to the total volume. These ingredients were mixed in a Henschel mixer in the form of powder, and were then melted and kneaded in a biaxial kneading machine having the screw configuration I. This prepared a polyolefin resin composition.

The polyolefin resin composition was rolled with use of a pair of rolls each having a surface temperature of 150° C. This prepared a sheet having a thickness of approximately 72 μm. This sheet was immersed in a hydrochloric acid aqueous solution (containing 4 mol/L of hydrochloric acid and 0.5% by weight of a nonionic surfactant) for removal of the calcium carbonate. Then, the sheet was drawn in the TD direction at 105° C. 6.2 times to provide a porous film (1). The properties of the porous film (1) produced were measured by the measurement methods described above. Table 2 shows the measurement results.

The coating solution A was applied to a surface of the porous film (1) by bar coater method. The porous film (1) was left to stand for 1 minute in an atmosphere having a temperature of 50° C. and a humidity of 70% to separate out poly(paraphenylene terephthalamide). The porous film (1) was washed with running water for 5 minutes, and then dried for 5 minutes in an oven having a temperature of 70° C. This prepared a laminated porous film (1). The above measurement methods were used to measure properties of the laminated porous film (3) and a porous film left after removal of the porous layer from the laminated porous film (1) Table 3 shows the measurement results.

When the piercing strength of the porous film, which was left after the removal of the porous layer from the laminated porous film (1), was measured, the porous layer was removed with use of tape (Scotch [produced by 3M Company]) by repeating a peeling operation three times.

Table 1 shows the production conditions described above.

Example 2

An operation similar to an operation of Example 1 was carried out except that (i) the polyethylene wax having a weight-average molecular weight of 1000 (FNP-0115 [produced by Nippon Seiro Co., Ltd.]) with a median size of 46 μm was replaced with polyethylene wax having a weight-average molecular weight of 1000 (FNP-0115 [produced by Nippon Seiro Co., Ltd.]) with a median size of 137 μm, that the biaxial kneading machine had the screw configuration II, and that (iii) the thickness of the sheet prepared by rolling the polyolefin resin composition was 62 μm. This prepared a porous film (2). An operation similar to an operation of Example 1 was carried out with use of the porous film (2). This prepared a laminated porous film (2). The measurement methods described above were used to measure properties of the porous film (2), the laminated porous film (2), and a porous film, which was left after removal of the porous layer from the laminated porous film (2). Tables 2 and 3 show the measurement results.

The porous layer was removed from the laminated porous film (2) by a method similar to the method used in Example 1.

Example 3

An operation similar to an operation of Example 2 was carried out except that the thickness of the sheet prepared by rolling the polyolefin resin composition was 68 µm. This prepared a porous film (3). An operation similar to an operation of Example 1 was carried out with use of the porous film (3). This prepared a laminated porous film (3). The measurement methods described above were used to measure properties of the porous film (3), the laminated porous film (3), and a porous film, which was left after removal of the porous layer from the laminated porous film (3). Tables 2 and 3 show the measurement results.

The porous layer was removed from the laminated porous film (3) by a method similar to the method used in Example 1.

Example 4

A corona treatment was performed on a surface of the porous film (3), prepared in Example 3. The coating solution B was then applied by gravure method to that surface of the porous film (3) to which the corona treatment had been performed, and was then dried. This prepared a laminated porous film (4). Table 1 shows the conditions for the production of the porous film (3). Then, the measurement methods described above were used to measure properties of the laminated porous film (4) and a porous film, which was left after removal of the porous layer from the laminated porous film (4). Tables 2 and 3 show the measurement results.

When the piercing strength of the porous film, which was left after the removal of the porous layer from the laminated porous film (4), was measured, the porous layer was removed by (i) immersing the laminated porous film into water, (ii) cleaning the laminated porous film for 3 minutes by irradiation with ultrasonic waves, and then (iii) drying the laminated porous film at room temperature.

Comparative Example 1

Operations similar to operations of Example 3 were carried out except that the biaxial kneading machine had the screw configuration I, as changed from the screw configuration II. This prepared a porous film (4) and a laminated porous film (5). The measurement methods described above were used to measure properties of the porous film (4), the laminated porous film (5), and a porous film, which was left after removal of the porous layer from the laminated porous film (5). Tables 2 and 3 show the measurement results.

The porous layer was removed from the laminated porous film (5) by a method similar to the method used in Example 1.

Comparative Example 2

Operations similar to operations of Comparative Example 1 were carried out except that the polyethylene wax having a weight-average molecular weight of 1000 (FNP-0115 [produced by Nippon Seiro Co., Ltd.]) with a median size of 137 µm was replaced with polyethylene wax having a weight-average molecular weight of 1000 (FNP-0115 [produced by Nippon Seiro Co., Ltd.]) in a granular form. This prepared a porous film (5) and a laminated porous film (6). The measurement methods described above were used to measure properties of the porous film (5), the laminated porous film (6), and a porous film, which was left after removal of the porous layer from the laminated porous film (6). Tables 2 and 3 show the measurement results.

The porous layer was removed from the laminated porous film (6) by a method similar to the method used in Example 1.

Comparative Example 3

The coating solution A was applied to a surface of a commercially available porous film. The porous film was left to stand for 1 minute in an atmosphere having a temperature of 50° C. and a humidity of 70% to separate out poly(paraphenylene terephthalamide). The porous film was washed with running water for 5 minutes, and then dried for 5 minutes in an oven having a temperature of 70° C. This prepared a laminated porous film (7). The measurement methods described above were used to measure properties of the commercially available porous film, the laminated porous film (7), and a porous film, which was left after removal of the porous layer from the laminated porous film (7). Tables 2 and 3 show the measurement results.

The porous layer was removed from the laminated porous film (7) by a method similar to the method used in Example 1.

[Results]

Table 1 shows the production conditions for Examples 1 through 4 and Comparative Examples 1 through 3.

TABLE 1

| | Production conditions | | | |
|---|---|---|---|---|
| | WAX particle size (µm) | Calcium carbonate particle size (µm) | Screw configuration | Coating solution |
| Example 1 | 46 | 0.1 | I | A |
| Example 2 | 137 | 0.1 | II | A |
| Example 3 | 137 | 0.1 | II | A |
| Example 4 | 137 | 0.1 | II | B |
| Comparative Example 1 | 137 | 0.1 | I | A |
| Comparative Example 2 | Granular | 0.1 | I | A |

Tables 2 and 3 show the measurement results for Examples 1 through 4 and Comparative Examples 1 through 3.

TABLE 2

| | Properties of porous films | | | |
|---|---|---|---|---|
| | Porous film | Base material film thickness (µm) | Base material weight per unit area (g/m$^2$) | Air permeability (sec/100 cc) |
| Example 1 | Porous film (1) | 17.1 | 8.2 | 120 |
| Example 2 | Porous film (2) | 13.0 | 6.2 | 133 |
| Example 3 | Porous film (3) | 15.6 | 6.9 | 121 |
| Example 4 | Porous film (3) | 15.6 | 6.9 | 121 |
| Comparative Example 1 | Porous film (4) | 13.9 | 7.0 | 116 |
| Comparative Example 2 | Porous film (5) | 19.0 | 7.1 | 73 |

TABLE 2-continued

Properties of porous films

| | Porous film | Base material film thickness (μm) | Base material weight per unit area (g/m²) | Air permeability (sec/100 cc) |
|---|---|---|---|---|
| Comparative Example 3 | Commercially available product | 10.3 | 5.6 | 108 |

TABLE 3

Properties of laminated porous films

| | Film thickness (μm) | Porous layer weight per unit area (g/m²) | Air permeability (sec/100 cc) | Piercing strength S (gf) | Piercing strength after porous layer removal Sp (gf) | Change amount Sp · S (gf) | SD temperature (° C.) |
|---|---|---|---|---|---|---|---|
| Example 1 | 21.9 | 3.0 | 217 | 397 | 402 | 5 | 133.2 |
| Example 2 | 16.6 | 2.3 | 230 | 361 | 378 | 17 | 133.4 |
| Example 3 | 19.8 | 3.1 | 225 | 328 | 350 | 22 | 133.3 |
| Example 4 | 18.9 | 5.3 | 139 | 335 | 353 | 18 | 133.2 |
| Comparative Example 1 | 20.3 | 3.9 | 243 | 320 | 351 | 31 | 134.8 |
| Comparative Example 2 | 21.4 | 2.8 | 182 | 246 | 280 | 34 | 134.6 |
| Comparative Example 3 | 14.8 | 2.5 | 188 | 389 | 428 | 39 | 135.4 |

Table 3 shows that the laminated porous films produced in the Examples each had a low shutdown (SD) temperature as compared to the laminated porous films produced in the Comparative Examples (Examples: approximately 133° C., Comparative Examples: approximately 135° C.). In other words. Table 3 shows that the laminated porous films produced in the Examples, each of which laminated porous films satisfied the conditions that (i) the difference (Sp–S) between the piercing strength (S) of the laminated porous film and the piercing strength (Sp) of the porous film, left after the removal of the porous layer from the laminated porous film, was within a range of 2 gf to 25 gf and that (ii) S was within a range of 300 gf to 400 gf, each had a shutdown characteristic superior to that of any of the laminated porous films produced in the Comparative Examples, each of which laminated porous films had Sp and S that did not satisfy the above conditions. Table 3 therefore proves that the laminated porous film of an embodiment of the present invention, which laminated porous film has Sp and S that satisfy the above conditions, is usable as a nonaqueous electrolyte secondary battery laminated separator that is thin and that includes a porous layer, yet has an excellent shutdown characteristic.

INDUSTRIAL APPLICABILITY

A nonaqueous electrolyte secondary battery laminated separator of an embodiment of the present invention is thin, yet has a good output characteristic and an excellent SD characteristic as well as an excellent piercing strength (physical strength). The nonaqueous electrolyte secondary battery laminated separator of an embodiment of the present invention is therefore usable in production of a nonaqueous electrolyte secondary battery having a good output characteristic and a high level of safety.

The invention claimed is:

1. A nonaqueous electrolyte secondary battery laminated separator comprising a laminated porous film, comprising:
   (a) a porous film containing a polyolefin component in an amount of not less than 80% by volume with respect to a total volume of the porous film (a); and
   (b) a porous layer containing a resin,
   the porous film (a) having a thickness of not less than 5 μm and not more than 20 μm,
   the laminated porous film having a thickness of not less than 6 μm and not more than 25 μm,
   the laminated porous film having a Gurley value of not more than 250 sec/100 mL,
   a piercing strength of the laminated porous film and a piercing strength of the porous film (a) after removal of the porous layer from the laminated porous film satisfy Formulae (1) and (2) below, $$2 \text{ gf} \leq Sp - S \leq 25 \text{ gf} \quad \text{Formula (1):}$$

$$300 \text{ gf} \leq S \leq 400 \text{ gf}, \quad \text{Formula (2):}$$

where
S is the piercing strength of the laminated porous film, and
Sp is the piercing strength of the porous film (a) after the removal of the porous layer from the laminated porous film.

2. The nonaqueous electrolyte secondary battery laminated separator according to claim 1,
wherein:
the porous layer further contains a filler; and
the filler is contained at a proportion of not less than 50 mass % and not more than 99 mass % with respect to a total amount of a combination of the filler and the resin.

3. The nonaqueous electrolyte secondary battery laminated separator according to claim 1,
wherein
the thickness of the porous film (a) is not less than 6 μm and not more than 14 μm.

4. A nonaqueous electrolyte secondary battery member, comprising:
a cathode;
a nonaqueous electrolyte secondary battery laminated separator according to claim 1; and
an anode, the cathode, the nonaqueous electrolyte secondary battery laminated separator, and the anode being arranged in this order.

5. A nonaqueous electrolyte secondary battery, comprising a nonaqueous electrolyte secondary battery laminated separator according to claim 1.

* * * * *